US006468481B1

(12) United States Patent
Anderson

(10) Patent No.: US 6,468,481 B1
(45) Date of Patent: Oct. 22, 2002

(54) METHOD AND APPARATUS FOR FULL ULTILIZATION OF SALT CRYSTALS IN BRINE

(76) Inventor: Charles E. Anderson, 1840 Waterville Rd., P.O. Box 4507, Macon, GA (US) 31213

(*) Notice: Subject to any disclaimer, the term of this patent is extended or adjusted under 35 U.S.C. 154(b) by 0 days.

(21) Appl. No.: 09/013,107

(22) Filed: Jan. 26, 1997

(51) Int. Cl.[7] .............................................. B01D 11/02
(52) U.S. Cl. ........................ 422/261; 422/281; 422/902
(58) Field of Search ................................ 422/261, 267, 422/278, 279, 281, 283, 902

(56) References Cited

U.S. PATENT DOCUMENTS 4,389,376 A * 6/1983 Kojima et al. .......... 422/261 X

* cited by examiner

*Primary Examiner*—Elizabeth McKane

(74) *Attorney, Agent, or Firm*—Harry I. Leon; Vivian L. Steadman

(57) ABSTRACT

A portable brining apparatus in which salt beds can be fully utilized between charges while simultaneously producing saturated brine in bulk is claimed. The apparatus comprises at least two salt dissolving tanks, each tank being generally cylindrical in shape and having a conical bottom in which a perforated exit pipe extends upwardly along the centerline thereof. Surrounding the exit pipe is a gravel bed which rests on the conical bottom and serves as a filter. Each tank in the apparatus is initially charged with a bed of salt placed atop the gravel. Valving allows one to maximize salt uptake in flows of water going into and out of the two tanks. When fully charged, the tanks are utilized in a parallel flow mode: water is introduced through spray nozzles placed near the top of each tank and then flows downwardly, in succession, through its salt bed, gravel filter and finally perforated exit pipe. The flows discharged from both tanks are combined in the final effluent. When the salt beds are substantially depleted and a salinity measurement indicates that an individual bed can no longer produce a fully saturated brine, the tanks are utilized in a series flow mode. Eventually, when the series flow mode fails to saturate the water in a single pass, the two tanks are utilized in a recirculation flow mode.

3 Claims, 3 Drawing Sheets

METHOD AND APPARATUS FOR FULL ULTILIZATION OF SALT CRYSTALS IN BRINE

BACKGROUND OF THE INVENTION

Formed when sodium chloride crystals are dissolved in water, brine is widely used in both home and industry. Ready supplies of brine of dependable concentration and in large quantity are much in demand.

The prior art describes numerous combinations for producing brine, as well as other aqueous salt solutions, of substantially constant density. In each of them, water is fed into a stationary vat in such a way that it flows through a single bed of salt, gradually dissolving it. The water feed rate and the depth of the salt bed determine the density of the salt solution which is produced. As the salt bed is consumed, this density falls unless the water feedrate is also reduced. But lowering this feedrate decreases the salt dissolving capacity of the apparatus as well. A popular remedy has been to insure steady-state operation by charging the vat continuously with crystalline salt at a rate sufficient to replenish dissolved salt.

For example, Courthope, in U.S. Pat. No. 1,928,008, patented Sep. 26, 1933, teaches this remedy. Specifically, Courthope discloses a process in which water is sprayed into a vat over a bed of rock salt. The vat includes a conically-shaped lower section above which is mounted a false bottom. Lodged thereon, the bed of rock salt filters newly formed brine as it flows downwardly en route to a valve fluidly connected to the lower section. To deliver a brine of substantially constant density, Courthope has the vat in his apparatus charged with a continuous stream of salt.

A modification of Courthope's salt dissolving process is described in U.S. Pat. No. 2,281,140, which issued Apr. 28, 1942. There Courthope et al. disclose a machine having a screen on which a bed of rock salt is supported. Water is fed to the lower portion of this bed and drawn off above it, as salt is fed continuously into the machine, a "common practice in the art" according to Courthope et al.

Likewise, Swartz, in U.S. Pat. No. 2,412,106, which issued on Dec. 3, 1946, discloses a method for dissolving salt in which salt is fed from a hopper into a dissolving tank. The salt feedrate is sufficient to maintain a salt bed with both uniform and constant depth. From a grid of inlet pipes mounted in the bottom of a tank, water flows upwardly through the salt bed, dissolving the salt. An overflow pipe situated near the top of this tank is used to direct the salt solution into an adjacent tank for storage.

Swartz, in U.S. Pat. No. 2,576,315, patented Nov. 27, 1951, teaches a modification of his earlier disclosed process in which water is introduced both at the bottom of a tank partially filled with salt and through inlet ports located above the salt bed. An effluent which has a salt concentration dependent upon the relative flow rates of these two inlet sources is produced. As a condition for controlling Swartz' process, the flow which passes upwardly through the bed must emerge as a saturated salt solution. To insure such a result, Swartz teaches that a minimum depth of salt bed must be maintained at all times.

Subsequent improvements in the prior art included the addition of a process step in which insoluble particles and undissolved salt particles are filtered from the brine with the use of a gravel bed. By 1967, gravel bed filters situated in salt dissolving tanks had become conventional practice according to Heiss et al. in U.S. Pat. No. 3,307,914.

SUMMARY OF THE INVENTION

The primary object of the present invention is to provide a low cost, highly efficient, and reliable salt dissolving process and apparatus which can be used to consistently provide saturated brine, even as a salt bed contained therein is being consumed, thereby allowing for full utilization of the salt bed between charges.

A further object of this invention is to provide a portable brining apparatus which can be used to supply saturated brine in quantities and at flow rates useful in industrial applications.

A still further object of the present invention is to provide such a portable brining apparatus in which the salt bed need not be replenished except at home base, thereby facilitating the transport of fresh brine to distant delivery sites.

A still further object of this invention is to provide a portable apparatus for temporarily withdrawing weak or partially saturated brine from a storage tank at a delivery site, readily concentrating this salt solution to form saturated brine, and quickly transferring the latter to said storage tank.

A still further object of this invention is to provide an improved method for quickly supplying many types and kinds of very expensive water processing systems with filtered, saturated brine.

In accordance with the present invention, there is provided an improved salt dissolving apparatus and a three stage process for utilizing this apparatus. In the first stage, water is introduced, into each of at least two tanks through a series of spray nozzles mounted near the top of each tank and around its outer periphery. The water is then passed through, in succession, beds of salt and of gravel lodged in each tank, gradually dissolving the salt, before being discharged therefrom as saturated brine. The two brine streams are then merged and subjected to a final filtration step.

In the second stage, which is triggered when at least one of the tanks by itself can no longer produce a saturated salt solution in its respective discharge stream, the method comprises introducing the discharge stream from one tank into the other tank. By fluidly connecting the two tanks together in series, the depth of the salt bed through which the water passes is effectively doubled. The second stage is continued until the two tanks so connected no longer yield a saturated brine.

In the third stage, the method comprises introducing only the discharge stream from each of the tanks into the other tank and recirculating this stream repeatedly, utilizing whatever salt bed remains to concentrate the brine until it reaches full saturation or the concentration of salt therein becomes stable over time, indicating the salt bed has been consumed.

At each stage, the salinity of the discharge streams are checked periodically using salinometers fluidly connected to the discharge lines of the two tanks.

In a preferred embodiment of the present invention, fresh water is passed through a water softener to remove any hardness therein before the water is introduced during the first stage into both tanks or, alternately, during the second stage into one tank. In a modification of this embodiment, a weak or unsaturated brine is pumped from an end user's facility into one or both of the tanks. This unsaturated brine can also be recirculated between the two tanks using stage three of the improved method so as to concentrate the brine before final discharge.

Additional benefits and advantages of the present invention will become apparent upon a reading of the description of the preferred embodiment taken in conjunction with the accompanying drawings.

DESCRIPTION OF THE PREFERRED EMBODIMENT

Figure 3:
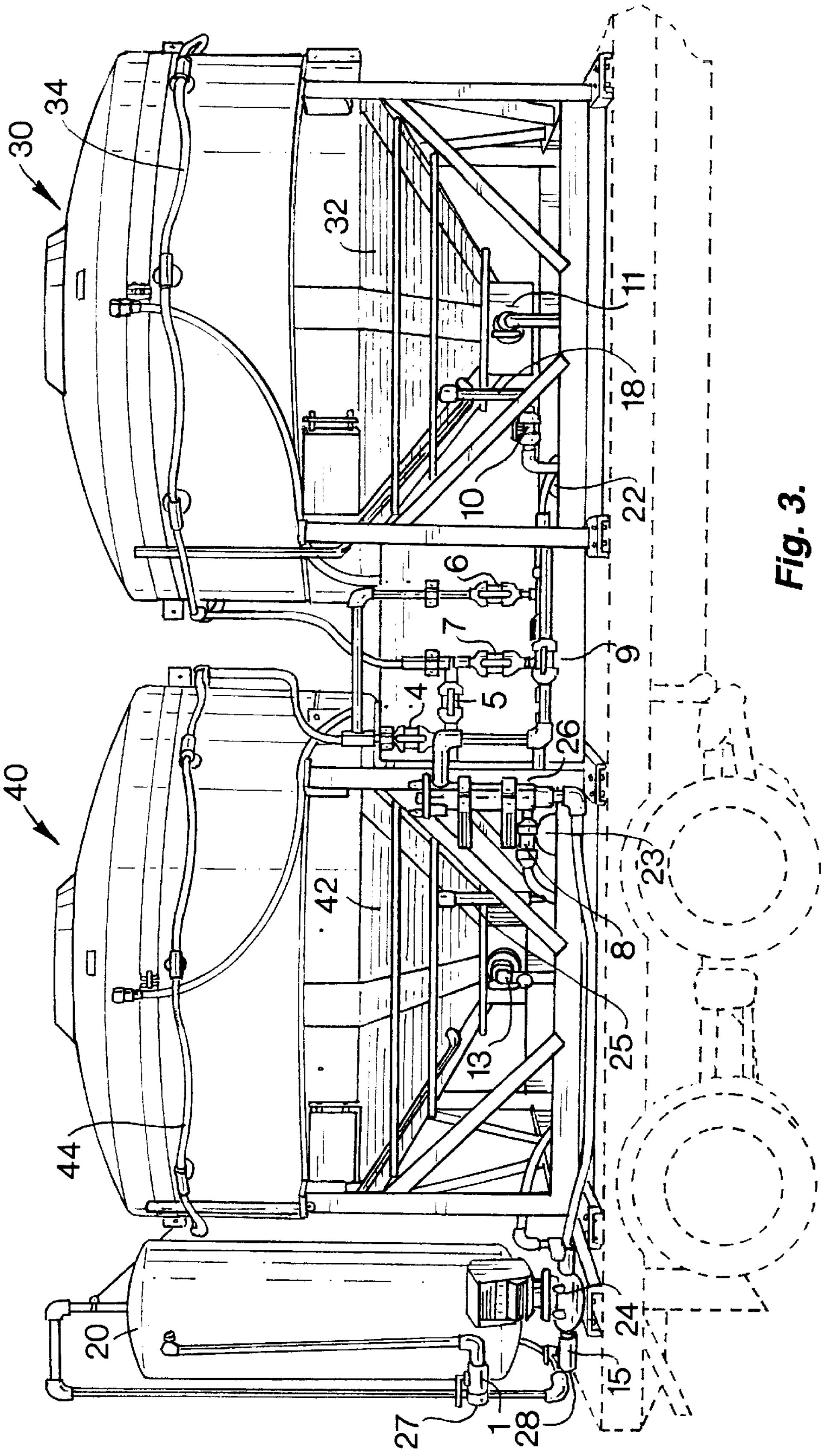
FIG. 3 is a perspective view of a two tank embodiment of the apparatus according to the present invention, in which the apparatus is shown mounted on the flat bed of a truck, the flat bed being illustrated by dashed lines.
Figure 4:
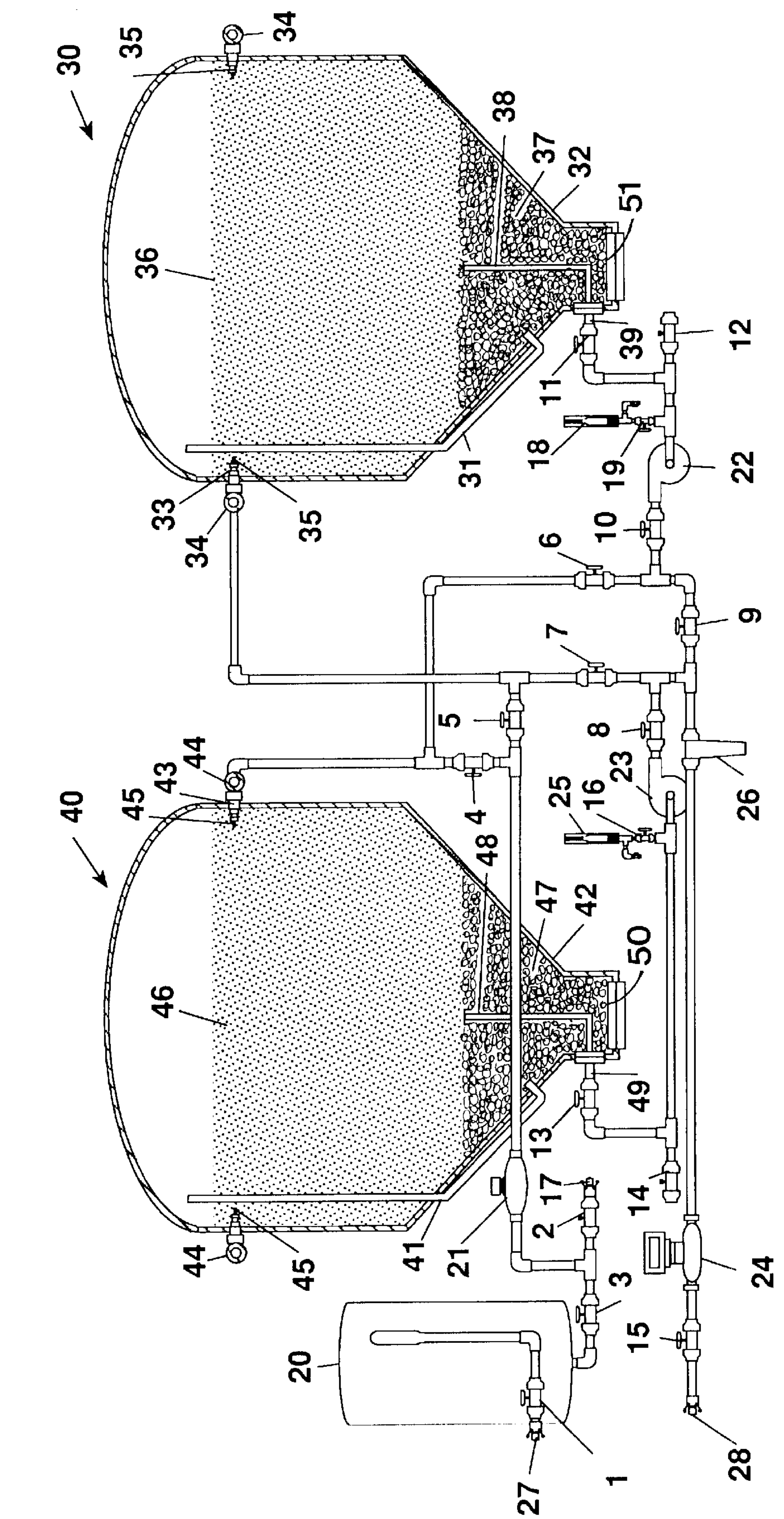
FIG. 4 is a schematic layout of the two tank embodiment according to FIG. 3.

The improved apparatus of this invention comprises a portable brining apparatus having at least two tanks 30, 40. In the preferred embodiment, each of these tanks has cylindrical side walls, a slightly rounded top and a bottom conical section 32, 42 (FIGS. 3 and 4). Tanks 30, 40 which have 1,400 gallon capacity each, such as the Polyprocessing Model 1400 gal. Cone Bottom Tank, have been found to be satisfactory; these tanks, which are fabricated from high density polyethylene, measure, by way of example, 6 feet 4 inches tall, are 7½ feet in diameter and have a wall thickness of ⅜ inch.

Figure 1:
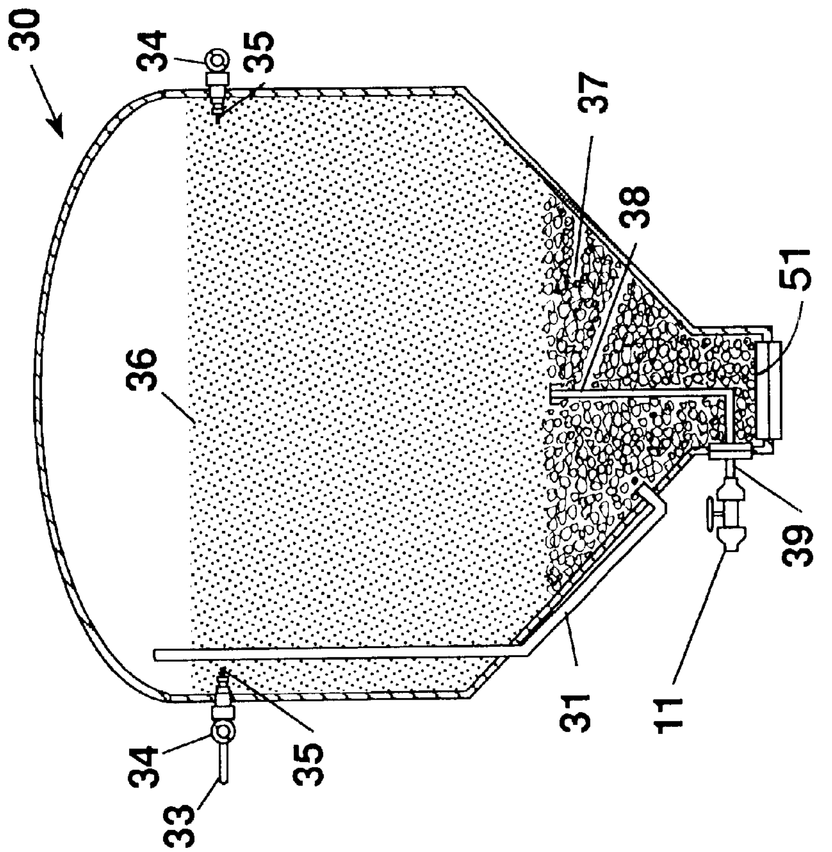
FIG. 1 is an elevation view in cross-section of one of two salt dissolving tanks in the apparatus according to the present invention, the second tank being identical in construction.
Figure 2:
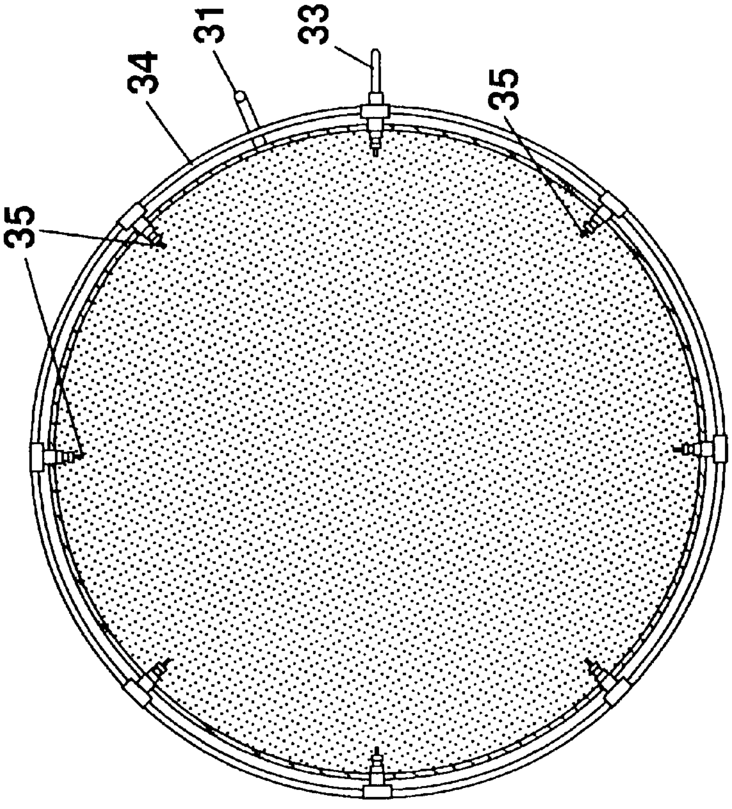
FIG. 2 is a plan view of the salt dissolving tank shown in FIG. 1 in which the top of the tank has been removed.

Near the top of the tank 30 is an inlet 33 fluidly connected to a hoop 34 mounted along the exterior perimeter of the tank (FIGS. 2 and 3). A series of spray nozzles 35 fluidly connected by tees to the hoop 34 are used to direct flow into the tank 30 (FIG. 2). As shown in FIGS. 1 and 4, a sight gage 31 is provided for measuring the level of solution in the tank 30.

A packed bed of quartz gravel, having size of about ¼ by ½ inch, placed in the conical section 32 forms a filter 37 which surrounds a perforated pipe 38. The pipe 38 extends up-wardly from and is fluidly connected to a outlet 39 for the tank 30 (FIG. 1). In the preferred embodiment, the pipe 38 measures, by way of example, 2 inches in diameter and is perforated with ⅛ diameter holes which have a combined total flow area of about 1½ times the cross-sectional flow area of the outlet 39.

Tank 40 is similar to tank 30 except that the inlet has been assigned the reference numeral 43 the sight gage 41, the hoop 44, the spray nozzles 45, the gravel filter 47, the perforated pipe 48 and the outlet 49.

Prior to use, each tank 30, 40 receives an initial charge of salt crystals which form salt beds 36, 46. Resting on top of the filter 37, 47, the bed 36, 46 can be filled up to and above the spray nozzles 35, 45 (FIG. 4). Salt crystals derived from diverse sources can be used, including sea salt with varying amounts of insoluble impurities.

The improved apparatus of the present invention further comprises a piping system designed for efficient and full utilization of the initial salt charges in both tanks 30, 40. The piping system and associated valves are operated not only to bring flow in and out of the tanks but also to vary the mode of flow throughout the apparatus. In accordance with the present invention, the piping system can be used to feed aqueous solutions into the tanks 30, 40 in any one of three basic modes: parallel flow, series flow and recirculation.

In use, an aqueous solution, which can have a salinity level within a wide range of values, is introduced through spray nozzles 35, 45 in the tank 30, 40. When hard water such as municipal water is used as the water supply, the inlet flow is directed first through water softener 20 via quick disconnect fitting 27; specifically, valves 1,3 are open and valve 2 is closed. Soft water, on the other hand, can be fed into the apparatus through quick disconnect fitting 17, bypassing the water softener 20.

The parallel flow mode is utilized when the salt beds 36, 46 in tanks 30, 40 is of sufficient depth that a single pass of a flow stream through each of them produces a saturated salt solution. In this flow mode, the preferred embodiment of the two tank brining apparatus can deliver up to 40 gallons per minute of saturated salt solution.

During parallel flow, incoming flow is divided so that a stream simultaneously enters each of the tanks 30, 40, flows downwardly through first the salt bed 36, 46 and then the gravel filter 37, 47, is collected in the pipe 38, 48, and is finally discharged from the tank. Now saturated with salt, the brine solution leaving the tank 30, 40 is monitored for salinity with the use of a salometer 18, 25 by momentarily opening valve 19, 16. After this salinity check, the flow from each tank 30, 40 enters its respective circulating pump 22, 23. Finally, the two separate streams are combined and fed into a bag filter 26 before being sent to an end user via a flow meter 24 and quick disconnect hose fitting 28.

The bag filter 26, which in the preferred embodiment is a Ronningen-Petter R-P Model 152 with a 100 mesh filter, is located downstream of both tank outlets 39, 49 and removes any undissolved matter not captured by the gravel filters 37, 47 (FIG. 4).

A suitable salometer for use in periodically checking the salinity of the flows discharged from the tanks 30, 40 is one available from Nagel Company marked “Degrees Salometer for Sodium Chloride”.

Circulating pumps 22, 23 which have worked well in this apparatus include the NPE Model 1ST1E4D44, which is a one horsepower stainless steel centrifugal pump.

In the piping system itself, all of the piping is preferably fabricated of polyvinylchloride. Ball valves have been found to give the best flow control. Specific valve settings during the parallel flow mode are as follows: valves 1, 3, 4, 5, 8, 9, 10, 11, 13, 15 are open; and valves 2, 6, 7, 12, 14, 16, 19 are closed.

When enough of the salt crystals are used, a single pass of an aqueous solution through the tanks 30, 40 may not be enough to bring the brine up to the desired salt concentration. At this point the valving configuration is changed, putting the the apparatus into a series flow mode, so that flow discharged from the tank 30 is introduced through spray nozzles 45 into tank 40. The flow discharged from tank 40 goes through the bag filter 26 and is now the final effluent. In this series flow mode, the preferred embodiment of the two tank brining apparatus can deliver up to 20 gallons per minute of saturated salt solution.

Valve settings for the series flow mode are as follows: valves 1, 3, 5, 6, 8, 10, 11, 13, 15 are open; and valves 2, 4, 7, 9, 12, 14 are closed. When salometer readings are taken, valves 16 and 19 are opened momentarily.

When the series flow mode described hereinabove cannot bring the brine to the desired concentration, the valving in the piping system can be set so that the brine recirculates through the tanks 30, 40, i.e., discharge from tank 30 is directed into the inlet of tank 40; and flow from the outlet of tank 40 is returned to the inlet of tank 30. Moreover, this flow pattern is often used when the end user’s brine solution needs to be concentrated and serves as the influent to the brining apparatus.

This recirculation mode is operational when valves 6, 7, 8, 10, 11, 13 are open and the rest of the valves are closed. Alternately, flow discharged tank 40 can be partially recirculated back into tank 30. Recirculation is continued until the desired concentration of the brine is met. Periodic readings are taken with the salometers 25, 18 by momentarily opening valves 16, 19, respectively. When brine is fully saturated or the maximum saturation which can be achieved by fully utilizing the salt beds in the tanks 30, 40 has been realized, valves 9 and 15 are opened, allowing the brine to discharge. Alternately, valve 9 can be partially opened to allow some discharge during recirculation.

When it is desired to drain the tanks 30, 40 for cleaning or maintenance, valve 12, 14, respectively, is opened (FIG. 4). Depending on the type of feed salt raw material used, which in the improved apparatus can be of many different types, porthole drains 50, 51 are in place to facilitate the removal of any/all deleterious material that may develop from the feed salt in the course of operations (FIG. 4).

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. In an apparatus for producing saturated brine in bulk in which an aqueous solution is introduced into a first tank near its top through at least one spray nozzle fluidly connected thereto and in which the aqueous solution is then allowed to flow downwardly, in succession, through a first bed of salt and a first bed of gravel lodged in the tank, gradually dissolving the salt, before being discharged from the bottom of the first tank as saturated brine, the improvement which comprises a second tank and at least one spray nozzle fluidly connected thereto proximate with the top thereof, the second tank having a second bed of salt and a second bed of gravel lodged therein, the first and second tanks having first and second perforated discharge pipes, respectively, mounted therein which extend upwardly within the gravel, and valving for fluidly connecting the first and second tanks in such a way that flow discharged from the bottom of the first tank is introduced into the second tank through its spray nozzle, the tanks being fluidly connected when the first salt bed is sufficiently depleted that the first tank by itself can no longer produce saturated brine in its respective discharge flow, so that both the first and second tanks can be used initially to produce saturated brine on their own and then the first and second tanks can be used together, thus increasing overall saturated brine production by the apparatus substantially above that which the first and second tanks charged with the same first and second beds of salt but operated independently of each other can generate.

2. The apparatus according to claim 1 which further comprises means for measuring salinity of the flow discharged from each tank.

3. The apparatus according to claim 1 in which when the first and second tanks are fluidly connected together, the aqueous solution introduced into the first tank is flow discharged from the second tank, so that the aqueous solution can be recirculated between the first and second tanks, thereby utilizing any undissolved salt remaining in the first and second salt beds to concentrate the brine until the salts beds have been fully utilized.

* * * * *